United States Patent
Gunawardana

(10) Patent No.: US 12,206,210 B2
(45) Date of Patent: Jan. 21, 2025

(54) MICRO USB CHARGING PORT

(71) Applicant: Sanath Gnanadarsha Gunawardana, Rockford, IL (US)

(72) Inventor: Sanath Gnanadarsha Gunawardana, Rockford, IL (US)

( * ) Notice: Subject to any disclaimer, the term of this patent is extended or adjusted under 35 U.S.C. 154(b) by 103 days.

(21) Appl. No.: 17/564,213

(22) Filed: Dec. 29, 2021

(65) Prior Publication Data

US 2022/0224062 A1 Jul. 14, 2022

Related U.S. Application Data

(60) Provisional application No. 63/134,965, filed on Jan. 8, 2021.

(51) Int. Cl.
*H01R 13/66* (2006.01)
*G06F 1/16* (2006.01)
*H01R 33/94* (2006.01)

(52) U.S. Cl.
CPC ......... *H01R 13/6608* (2013.01); *H01R 33/94* (2013.01); *G06F 1/1632* (2013.01)

(58) Field of Classification Search
CPC ........................ H01R 13/6608; H01R 33/94; H01R 2201/06; H01R 13/58
See application file for complete search history.

(56) References Cited

U.S. PATENT DOCUMENTS

| | | | | |
|---|---|---|---|---|
| 11,272,861 | B1* | 3/2022 | Filipovic | H04B 1/3888 |
| 2010/0262845 | A1* | 10/2010 | Goel | G06F 11/1456 |
| | | | | 713/300 |
| 2013/0229148 | A1* | 9/2013 | Khan | H02J 7/00036 |
| | | | | 320/108 |
| 2015/0091499 | A1* | 4/2015 | Sun | H02J 7/007 |
| | | | | 320/137 |
| 2016/0370835 | A1* | 12/2016 | Erickson | H02J 7/00 |
| 2018/0356909 | A1* | 12/2018 | Dayer | G06F 3/03541 |
| 2019/0027944 | A1* | 1/2019 | Grzybowski | H02J 7/0044 |
| 2020/0156919 | A1* | 5/2020 | Reichelt | B67D 1/0855 |
| 2020/0374979 | A1* | 11/2020 | Rice | H04W 88/06 |

\* cited by examiner

*Primary Examiner* — Michael C Zarroli

(57) ABSTRACT

The handheld electronic user device default charging and data port micro USB Female connector is divided by an interface which is composed of a microchip and two micro USB Female connectors configured to separate the power transmission channel and data transmission channel to create two separate connections and then handheld electronic user device default charging and data port micro USB Female connector is replicated with the above said two micro USB Female connectors which is secured to handheld electronic user device protective case back wall outer surface away from the edges or mounted on a Popup Door which is sunk into the handheld electronic user device body through the back cover.

1 Claim, 10 Drawing Sheets

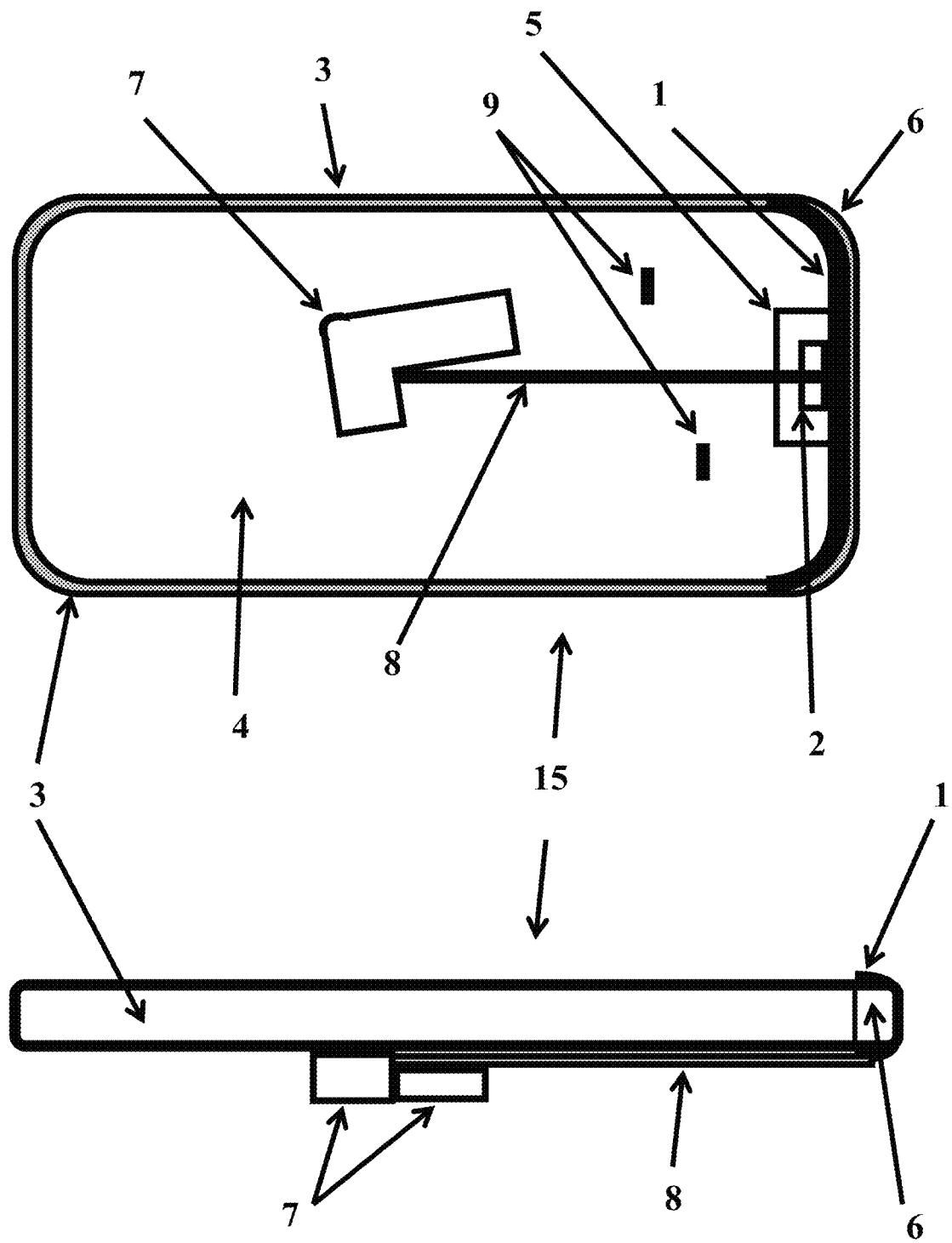

Fig 5
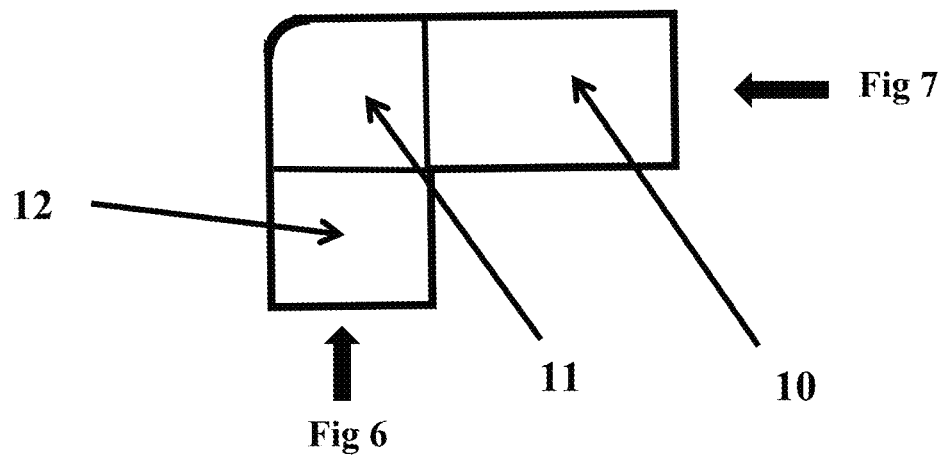
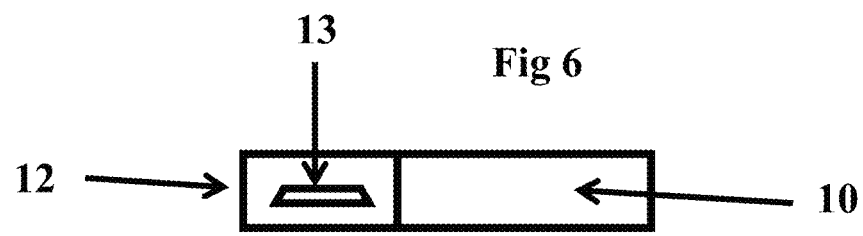
Fig 6
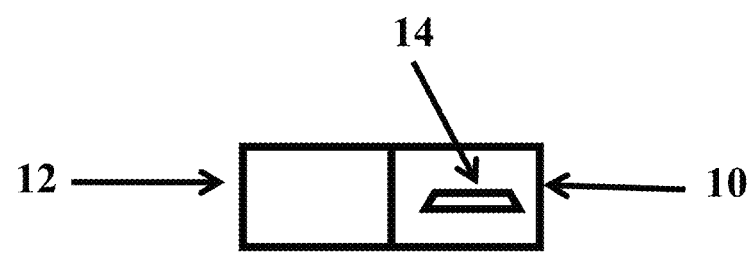
Fig 7

Fig 8
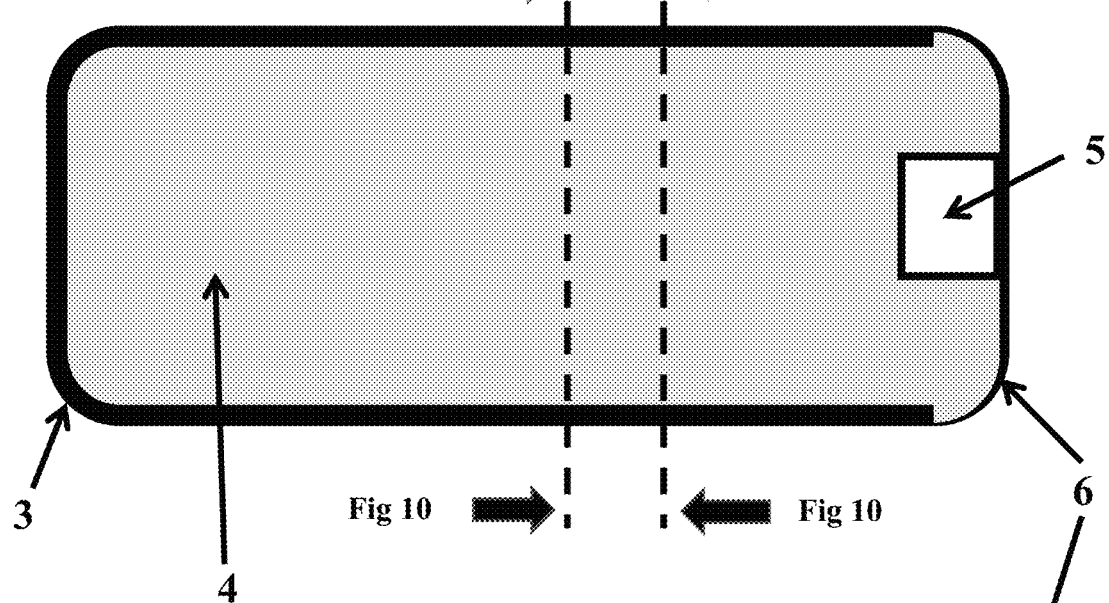
Fig 9
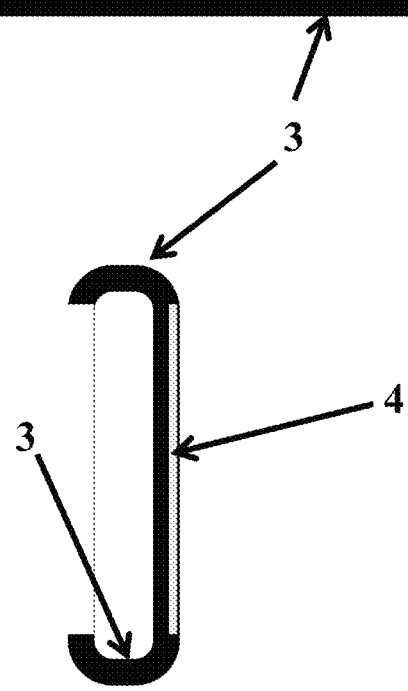
Fig 10

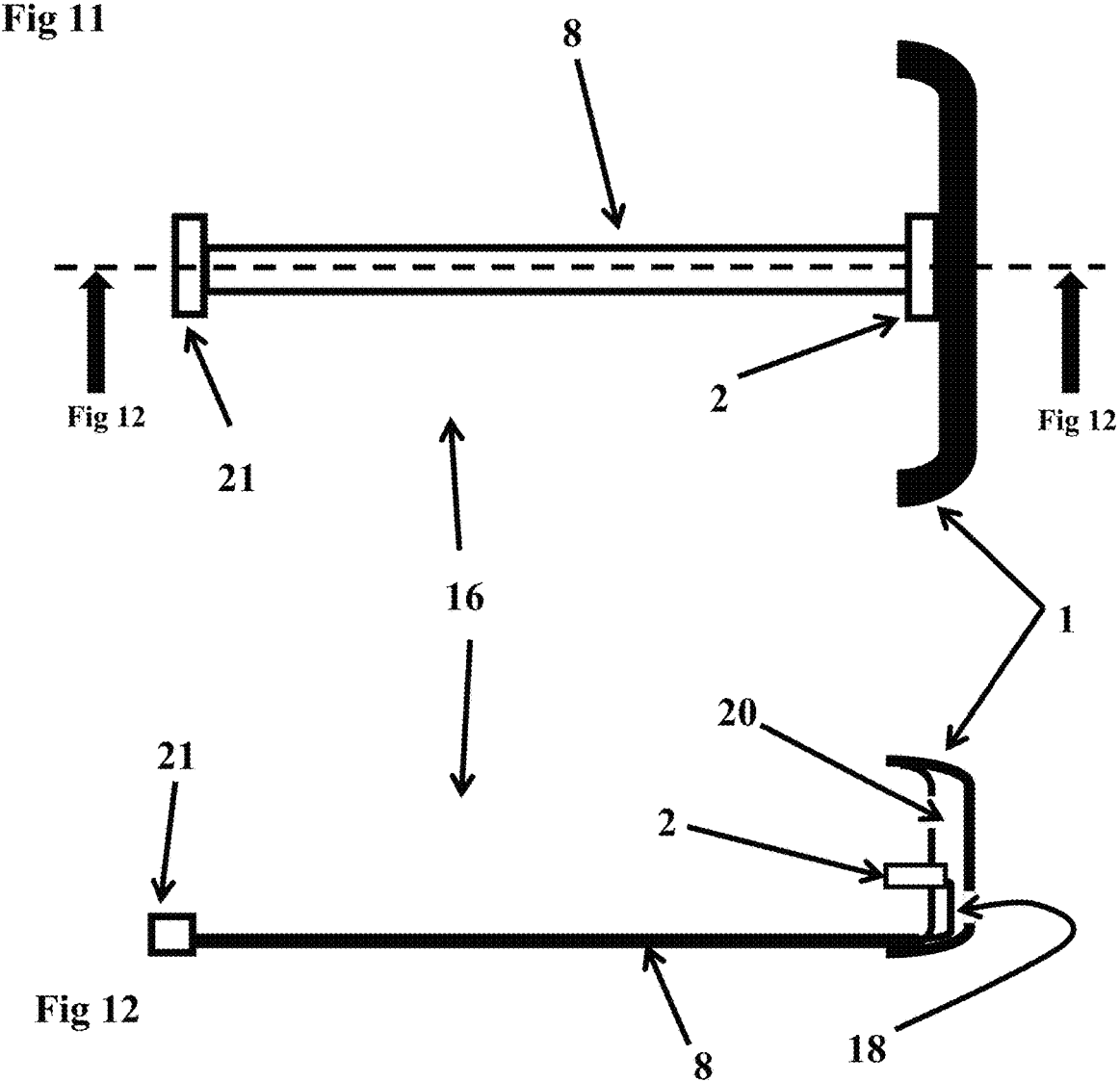
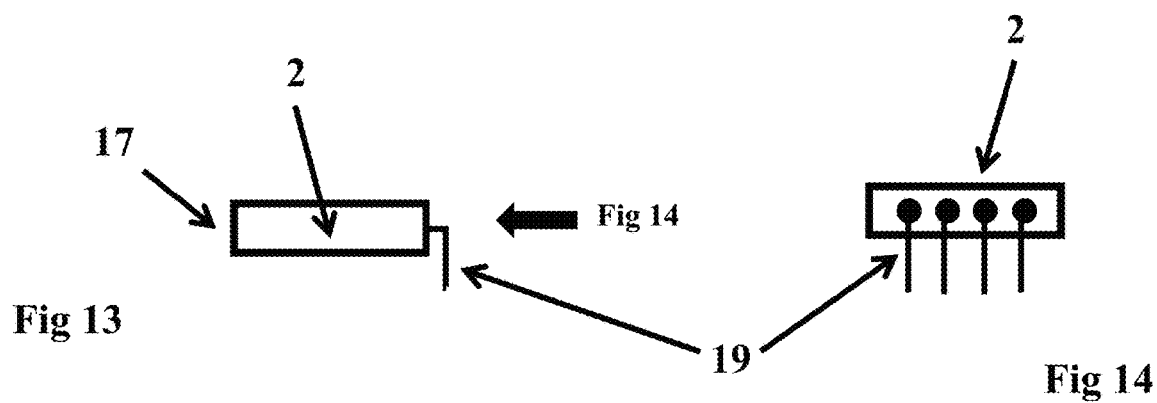

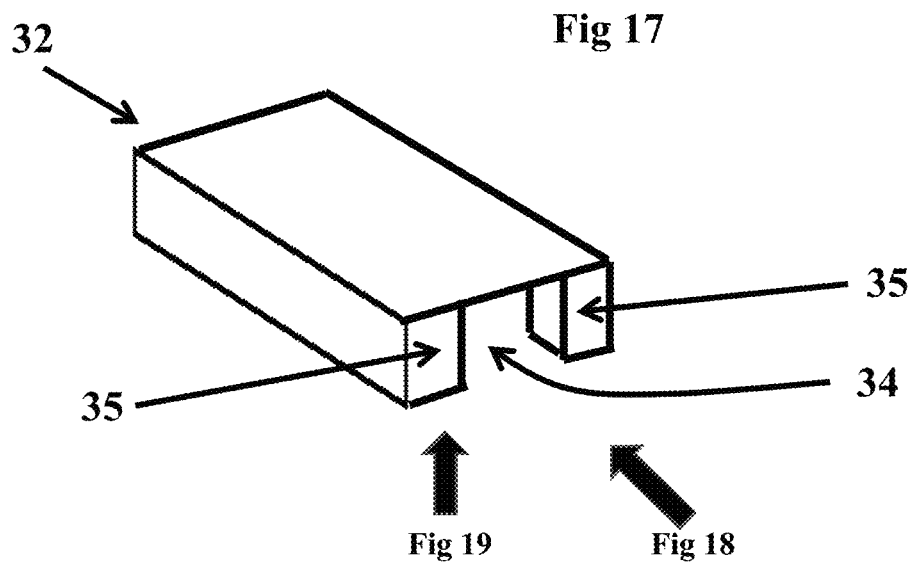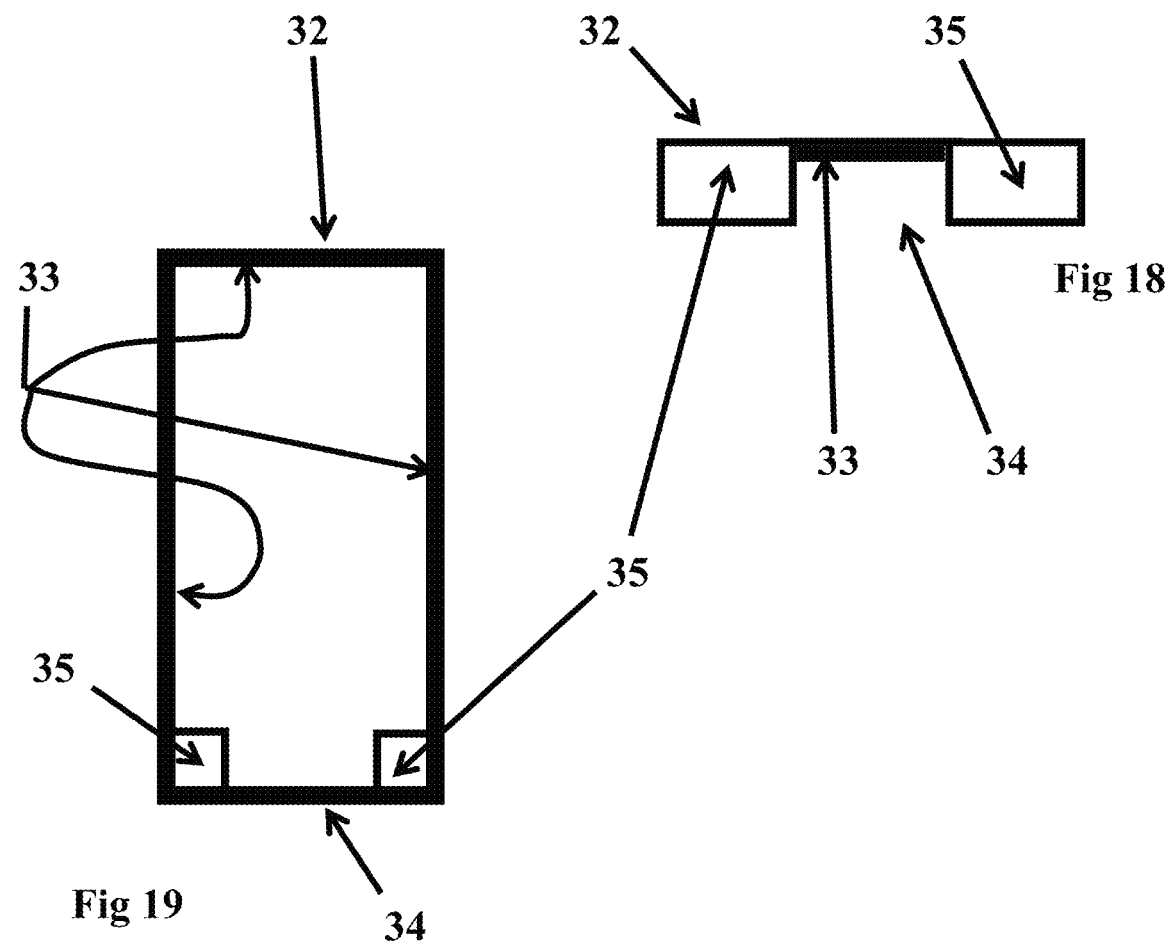

MICRO USB CHARGING PORT

Provisional application No. 63/134,965, confirmation number 7849.

BACKGROUND OF THE INVENTION

Modern day portable electronic devices have charging and data port micro USB connector on the side edges of the device. While charging if the device falls accidentally, the micro USB connector tail end of the charging cable can collide with an object or the ground. This impact will exert excessive force on the charging-cable micro USB connector-stem, the device charging & data port micro USB connector mounts and the connection-pins. Such events can cause damage to the device charging and data port micro USB connector or the charging cable connector-stem or both. If user device falls into a confined space where user can't reach, the normal tendency is to use the charging cable to retrieve the device. Such event will exert force on the charging-cable micro USB connector-stem, the user device charging and data port micro USB connector mounts, and the connection-pins. Above said excessive force will bend the micro USB connector-stem and damage the user device charging and data port micro USB connector. This damage will result in the user having to replace the charging cable or the user device or both.

To avoid the added financial burden, the low-cost Connector Protection System was invented. Further the invention uses parts already available in the market. Therefore, device accessory manufactures can continue their production without changing the manufacturing process. Completely changing a production line will cost a fortune for manufacture and it will increase the cost of the product. Small modification to production lines of user-device manufactures will not soar the market price of the product. User device manufactures change the device appearance, configuration often to produce new versions. Hence the user-device manufacture production lines are more flexible than the accessory manufactures. Therefore, the feasible solution is to make small changes to the user-device at the manufacturing level to stay compatible with the accessories in the market. For the existing user devices, introduce an interface compatible with the accessories available in the market. The invention will allow the existing users to continue with the user devices and the accessories they have already. Thereby the invention will help the household to save money as well as the accessory manufacture to continue their business without any added capital expenditure.

The invention will add protection to the handheld electronic user devices, such as waterproofing and protection from impact on connectors. The Connector Protection System will not hinder or alter the original functions and the flexibility of the handheld electronic user devices that currently exist in the market. The invention allows the user to answer the calls as usual, with privacy, while device is charging. Connector Protection System is user friendly and preserves the handheld electronic user devices versatility and the originality. With Connector Protection System there is no requirement to place the handheld electronic user device on a docking station to charge the battery or transfer data.

FIELD OF THE INVENTION

Patent primary class to be determined by USPTO.

SUMMARY OF THE INVENTION

The invention is named Connector Protection System, and hereafter will be referred to as CPS throughout this application. The concept of the CPS is as follows. The handheld electronic user device default, charging and data, port micro USB Female connector is divided by an interface which is composed of a microchip and two micro USB Female connectors configured to separate the power transmission channel and data transmission channel to create two separate connections. The handheld electronic user device default, charging and data, port micro USB Female connector is replicated with the above said two micro USB Female connectors which is secured to handheld electronic user device protective case back wall outer surface, away from the edges or mounted on a Popup Door which is sunk into the handheld electronic user device body through the back cover.

The CPS is compatible with the regular charging cables available in the market. The CPS has two versions. The aftermarket version called CPSAMV and manufacture version called CPSMV.

The CPSAMV is composed of two separate micro USB Female connectors 13 & 14 which are housed inside two separate Replaceable Adaptors 28 and a microchip 23 combined with handheld electronic user device protective case 15 to replicate the default charging & data port micro USB Female connector of the handheld electronic user device. This interface creates two separate connectors such as one connector 14 exclusively for charging and another separate connector 13 exclusively for data transfer. The said interface is composed of a single micro USB L shaped Male connector named as Connector Stem 2 attached to a flexible multi-pair electrical cable named as Bus Feeder 8 and a microchip 23 with two micro USB Female connectors are bridged to the remaining end of the same cable. The micro USB Male L shaped connector named as Connector Stem 2 is semi-permanently, externally, plugged into the handheld electronic user device default charging-data port micro USB connector all the time: the other end of the said cable 8, with Replaceable Adaptor 28 and Microchip 23 are mounted on the Case Assembly 15, Back Wall 4 outer surface away from the edges of the handheld electronic user device.

The CPSAMV and CPSMV both use two micro USB Female connectors to split default charging port micro USB connector into two connectors. The CPS interface is composed of positive and negative power connection pins of a micro USB Male connector 2 bridged with positive & negative power connection pins of a micro USB Female connector 14 via an electrical cable 8. The positive & negative data connection pins of the said micro USB Female connector 14 are left as an open circuit to form a connection exclusively for charging. Sametime the positive & negative data connection pins of the said micro USB Male connector 2 are bridged with positive & negative data connection pins of a separate micro USB Female connector 13 while positive & negative power connection pins of the said second micro USB Female connector 13 are kept as an open circuit to form a separate connection exclusively for data transfer. The above arrangement will create one micro USB Female connector exclusively for charging and a separate micro USB Female connector exclusively for data transfer.

The CPSMV version is a miniaturized version of CPSAMV: that can be integrated into the handheld electronic user device during manufacturing process. The manufactures will use the parts they already have along with few new ones.

Connector Protection System Manufactures Version replicate and divide the user device default micro USB Female connector of the charging and data port. CPSMV is composed of two micro USB Female connectors 13 & 14 which are housed in two separate Replaceable Adaptors 28 bridged with a microchip named as Microchip 23 that is bridged with Bus Feeder 8, to provide two separate connectors such as one connector exclusively for charging and another separate connector exclusively for data transfer. The components mentioned in this paragraph are mounted on a popup door 41 that is sunk into the handheld electronic user device chassis through the back cover. The replicated charging-data connectors will be compatible with regular charging cables available in the market.

BRIEF DESCRIPTION OF DRAWINGS

All drawings and figures are not to scale. Numbers are used to show components and vital points. All parts in drawings: front view depicts the view when you face the display of the user device: rear view depicts the view when you face the back-cover side of the user device: when user device is held up right & you face the display of the user device, the orientation of your hands respectively depicts left side, right side, Top, Bottom views. FIGS. 1 to 26 are on 10 sheets.

FIG. 1 is rear view of the assembled CPSAMV. (Sheet 1)

FIG. 2 is side view of the assembled CPSAMV. (Sheet 1)

FIG. 3 is front view of the assembled CPSAMV. (Sheet 2)

FIG. 4 is cross sectional view of the FIG. 3. (Sheet 2)

FIG. 5 is Front view of the Terminal Box 7 (Sheet 3)

FIG. 6 is side view of the Terminal Box 7 (Sheet 3)

FIG. 7 is bottom view of the Terminal Box 7 (Sheet 3)

FIG. 8 is front view of the Case Assembly 15 (Sheet 4)

FIG. 9 is side view of the Case Assembly 15 (Sheet 4)

FIG. 10 is cross sectional view of the removed midsection of FIG. 8 (Sheet 4)

FIG. 11 is front view of the Connecting Bridge 16 (Sheet 5)

FIG. 12 is cross sectional view of the FIG. 11 (Sheet 5)

FIG. 13 is side view of the Connector Stem 2 (Sheet 5)

FIG. 14 is bottom view of the Connector Stem 2 (Sheet 5)

FIG. 15 is front view of the Junction Box 11 (Sheet 6)

FIG. 16 is front view of the Power Connector Holder 10 (Sheet 6)

FIG. 17 is 3-Dimensional view of the Protective Case 32 (Sheet 7)

FIG. 18 is bottom view of the Protective Case 32 (Sheet 7)

FIG. 19 is rear view of the Protective Case 32 (Sheet 7)

FIG. 20 is back view of the User Device 38 with CPSMV (Sheet 8)

FIG. 21 is side view of the User Device 38 with CPSMV (Sheet 8)

FIG. 22 is cross sectional view of the FIG. 20 (Sheet 8)

FIG. 23 is Bottom view of assembled Popup Door 41 of CPSMV (Sheet 9)

FIG. 24 is Front view of assembled Popup Door 41 of CPSMV (Sheet 9)

FIG. 25 is Back view of the Door Cavity 40 of CPSMV (Sheet 10)

FIG. 26 is cross sectional view of the FIG. 22 (Sheet 10)

DETAIL DESCRIPTION OF THE INVENTION

CPSAMV (FIG. 1, 2, 3, 4, 11, 12)

Figure 3:
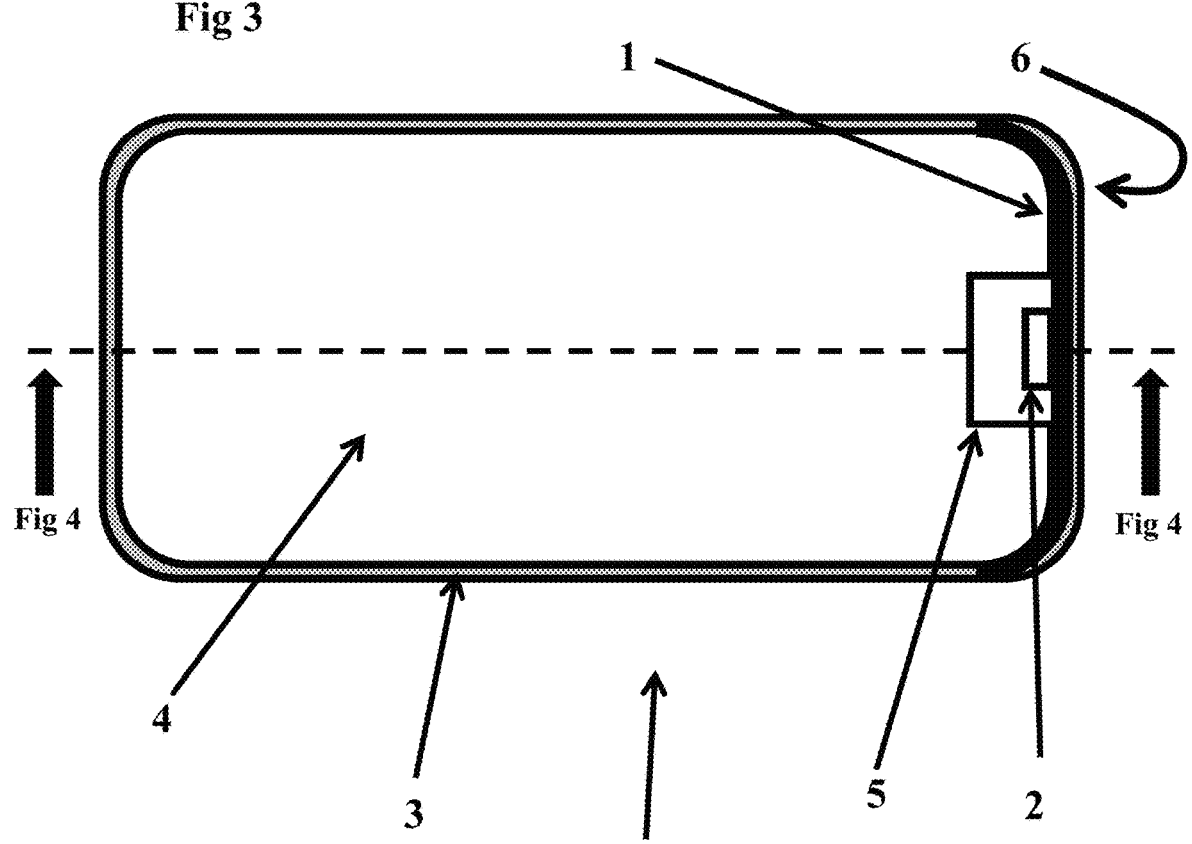
Figure 4:
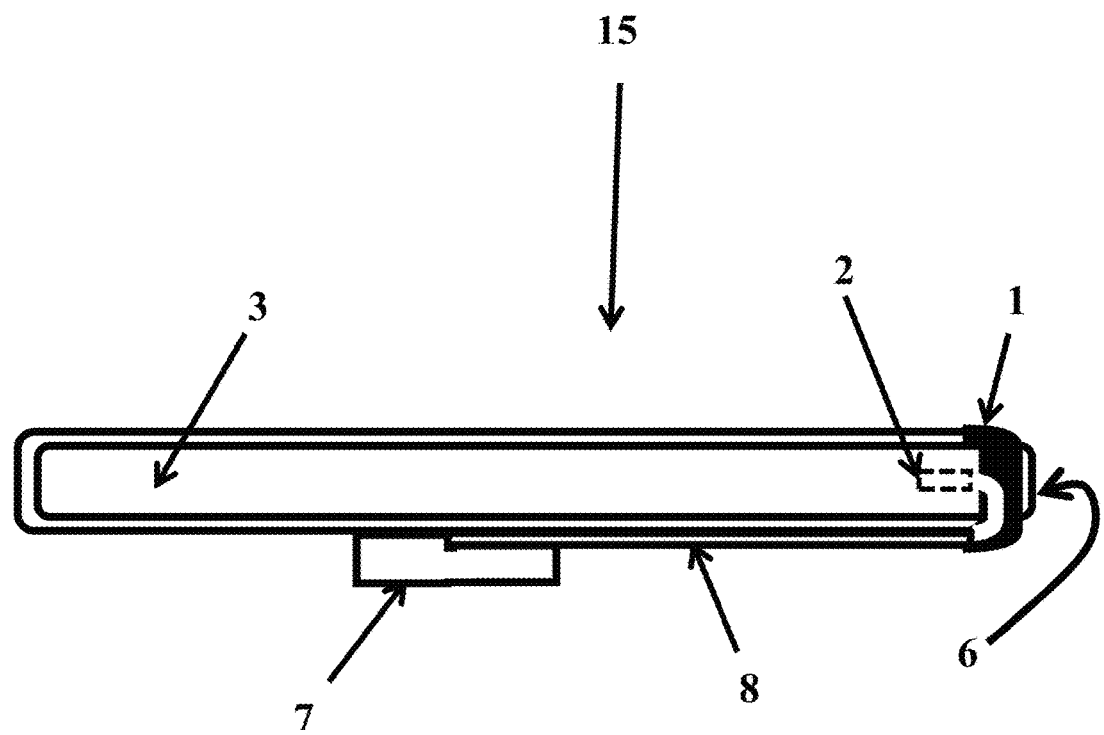
Figure 15:
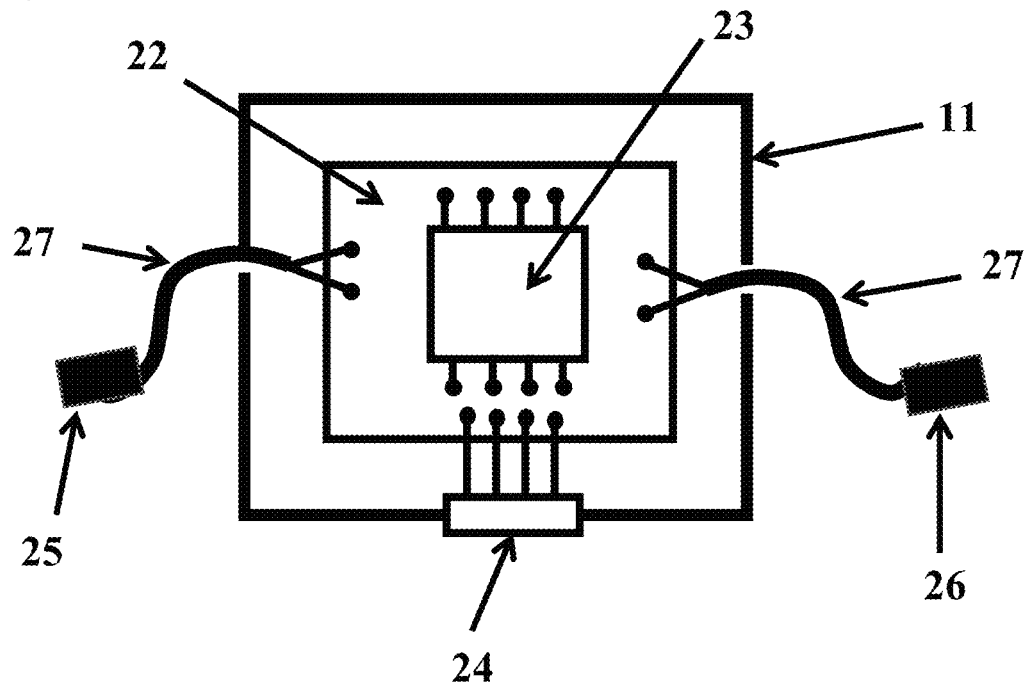
Figure 16:
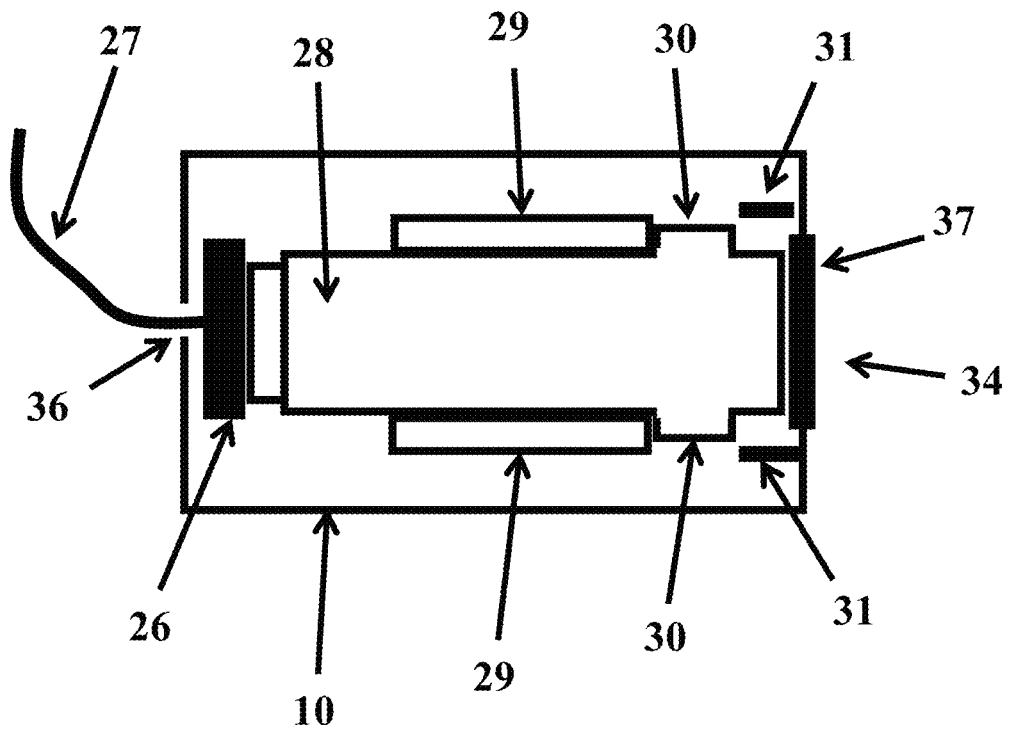

The CPSAMV is composed of Connector Bridge 16, Terminal Box 7, and Case Assembly 15.

Connector Bridge 16 (FIG. 11, 12, 13)

The Connector Bridge 16 is composed of Connector Stem Holder 1, Connector Stem 2, and Bus Feeder 8. The Connector Stem 2 with Connecting Pins 19 which is bridged with the Input Side 18 of Bus Feeder 8 and is molded into the inner wall named as Inner Depth Wall 20 of the Connector Stem Holder 1 to form a single piece.

Connector Stem Holder 1 is made of shock-absorbing, flexible and waterproof material. Connector Stem Holder 1 is composed of U-shaped straight piece with both ends bent at ninety degrees while the said Connector Stem Holder 1 is placed between Thin Strip 6 & the bottom edge of the user device.

Connector Stem 2 consists of a micro USB Male connector. The said micro USB Male connector connection pins designated to solder the electrical cable named as Connecting Pins 19 are bent by ninety degrees. The Connector Stem 2 is plugged in to the handheld electronic user device default charging & data port micro USB connector and stay plugged in all the time.

Bus Feeder 8 is composed of multi-pair electrical cable with a rectangular shaped flexible insulation jacket and one end of the Bus Feeder 8 is named as Input Side 18 which is bridged with Connector Stem 2 via Connecting Pins 19; other end of the same Bus Feeder 8 is connected to a plug type electrical connector named as Output Connector 21 which is plugged in to Input Connector 24 on the PCB 22.

Terminal Box 7 (FIG. 1, 2, 4, 5, 6, 7)

Junction Box 11, Power Connector Holder 10, and Data Connector Holder 12 compose a Terminal Box 7.

The Terminal Box 7 is secured to the Back Wall 4 of the Case Assembly 15.

Junction Box 11 is a square shape box made of waterproof heat resistance material. A Microchip 23 mounted on PCB 22 is housed inside the Junction Box 11. Data Output Connector 25 and Power Output Connector 26 are bridged to PCB 22 via Wires 27. Small drill holes are made on two sidewalls of the Junction Box 11 to accommodate wire 27. The Bus Feeder 8 Output Connector 21 is connected to the Input Connector 24 that is mounted on the PCB 22 which is inside the Junction Box 11. A non-removable waterproof cover is placed on top, to seal the Junction Box 11.

The Microchip 23 is mounted on PCB 22 which is a printed circuit board; Input Connector 24 is bridged to input pins of the Microchip 23; first and second output pins of Microchip 23 are bridged with the Wire 27 of Data Output Connector 25 via PCB 22; third and fourth output pins of the Microchip 23 are bridged with the Wire 27 of Power Output Connector 26 via PCB 22. The said PCB 22 is composed of plug type electrical connector named as Input Connector 24 secured to PCB 22 to facilitate all input connections to the Microchip 23; two separate electrical cables both named as Wire 27 are soldered to PCB 22 respective terminals to facilitate connection from PCB 22 to Data Output Connector 25 and Power Output Connector 26.

Power Connector Holder 10 (FIG. 5, 6, 7, 16)

Power Connector Holder 10 is a rectangular shaped box. Power Connector Holder 10 and all its parts are made of water-proof heat resistance material. Power Connector Holder 10 is composed of Replaceable Adapters 28, Adapter Guides 29, Cover Guide Blocks 31, Power Output Connector 26, Protective Cover 32, Connector Opening 34, Hole 36 and Connector Water Seals 37. Power Connector Holder 10 is secured to Terminal Box 7 next to Junction Box 11.

Connector Opening 34 is a wide-opened slot: placed on one of the short-edge sidewalls of the Power Connector Holder 10. The Connector Water Seal 37, which is a rubber O-ring, is secured to Connector Opening 34 mouth.

Hole 36 is a circular opening placed on the side wall on opposite side of the Connector Opening 34: it has a slit from top of the side wall to center of the Hole 36.

Replaceable Adapter 28 is composed of a micro USB Female connector named as Power Connector 14 secured to one end of the Replaceable Adaptor 28 and a plug type electrical connector that is bridged with the said micro USB Female connector 14 through the body of the Replaceable Adaptor 28 is secured to the other end of the same Replaceable Adaptor 28. The said plug type electrical connector is coupled with the Power Output Connector 26 which is attached to PCB 22 via Wire 27. The second Replaceable Adapter 28 has the same above said arrangement except the said micro USB connector is named as Data Connector 13 and the said electrical connector is coupled with Data Output Connector 25 which is attached to PCB 22 via Wire 27.

Adapter Locks 30 are two-blocks molded to both sides of the Replaceable Adapter 28, near Female micro USB connector end.

Adapter Guides 29 are rectangular blocks placed parallel to the long-edge-side of the Power Connector Holder 10.

Cover Guide Blocks 31 are placed on the bottom, inner surface, of the Power Connector Holder 10: close to both ends of the Connector Opening 34.

Power Output Connector 26 is an electrical female connector attached to Wire 27. The Wire 27 is placed into Hole 36 through slit opening above the Hole 36. After placing the Wire 27 into the Hole 36, the slit and the Hole 36 is sealed with waterproof material. The Power Output Connector 26 is permanently secured inside the Power Connector Holder 10, near Hole 36.

Protective Cover 32 is a removable rectangular box: with an open bottom; side walls are only on long-edge-side. Locking Posts 35 is a square block secured to both ends of the Connector Opening 34. Cover Water Seal 33 is secured to inner surface of the Protective Cover 32 edges that meets the Power Connector Holder 10 and Junction Box 11.

Data Connector Holder 12 (FIG. 5, 6, 7)

The Data Connector Holder 12 and all the components associated with it are identical to Power Connector Holder 10 and its components. Instead of the Power Output Connector 26, the Data Output Connector 25 is secured inside the Data Connector Holder 12.

Case Assembly 15 (FIG. 1, 2, 3, 4)

Case Assembly 15 is composed of Retainer Strips 3 with thin strip 6 and Back Wall 4 along with cable management clips named as Cable Retainers 9 which is mounted on the Back Wall 4 outer surface are molded as a one Piece. All components of the Case Assembly 15 are made of waterproof, fire-resistance, shock absorbing and flexible material. Case Assembly 15 is a rectangular shaped box: with an arc shaped four corners; front side is open, and back is covered with Back Wall 4; all four sidewalls, top bottom & right left, are named as Retainer Strip 3. The Case Assembly 15 is externally installed on handheld electronic user device and stay installed all the time.

Retainer Strip 3 which is a thick strip without holes or openings that formulate a rectangular shape frame with arc shaped four corners; Top, right, left, sidewalls are U-shaped to form a trench on the inner walls of the Retainer Strip 3. The straight bottom section of the Retainer Strip 3, near Cover Opening 5 is named as Thin Strip 6 which is thinner than the other areas of the Retainer Strip 3. Thin Strip 6 both ends are arc shaped sections. Retainer Strip 3 and the Thin Strip 6 are molded as a single piece.

Back Wall 4 is a thin sheet made of waterproof, fireproof and flexible material: molded to Retainer Strip 3 rear edges from all sides, top, bottom, right. Left. A square shaped slot is removed from bottom edge of the Back Wall 4 to form the Back Wall Opening 5.

Cable Retainers 9 are cable managing, two legs, small U clips: they are secured to Back Wall 4 outer surface using one leg of the U clip. Cable Retainers 9 are placed in such way opening of the U clips facing each other.

CPSMV (FIG. 20, 21, 22, 23, 24, 25, 26)

The CPSMV is composed of Popup Door 41, Door Cavity 40, Junction Box 11, Bus Feeder 8. The Junction Box 11 and Bus Feeder 8 used in CPSMV has the same components of the Junction Box 11 and Bus Feeder 8 used in CPSAMV.

Figure 20:
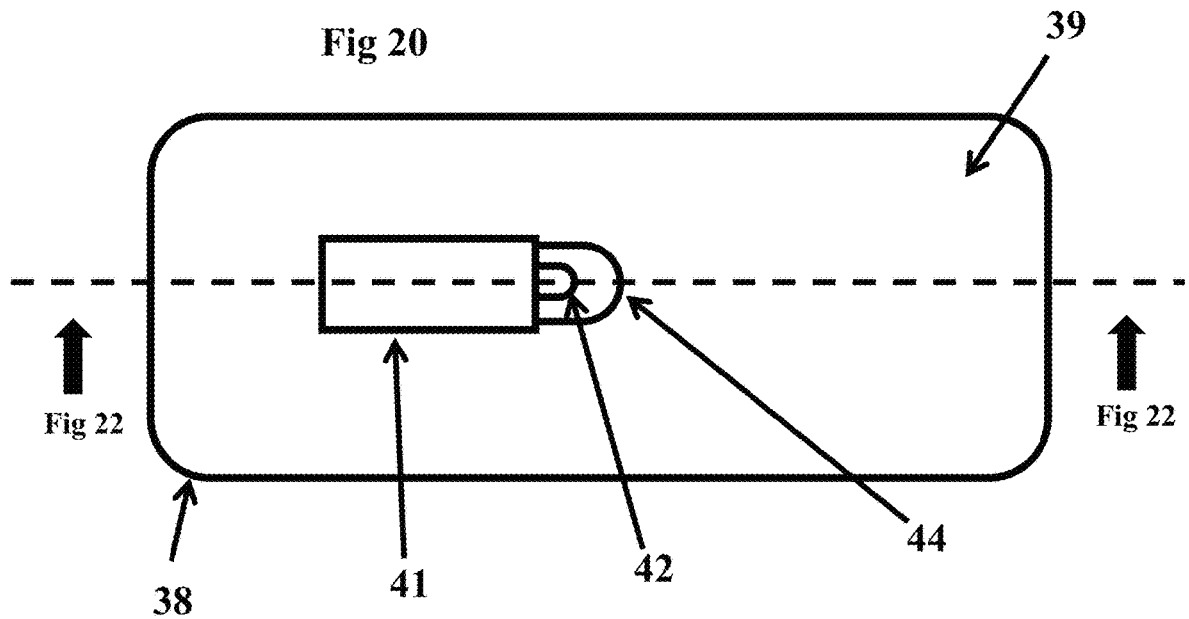
Figure 21:
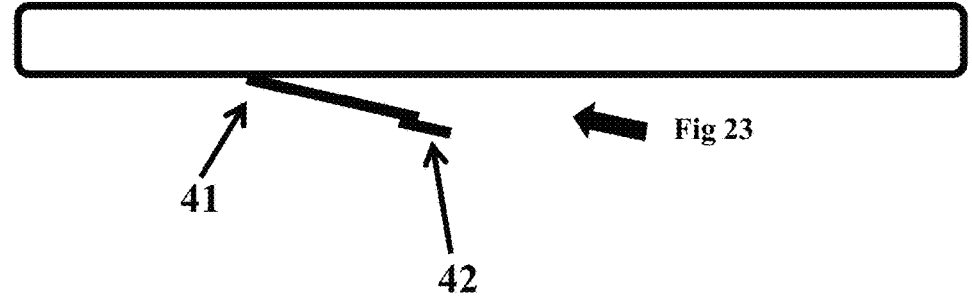

Popup Door 41 (FIG. 20, 21)

Popup Door 41 is composed of Door Flap 43, Adapter Guides 29, Replaceable Adaptors 28, Door Handle 42, and door Operating Mechanism 47.

Door Flap 43 is a waterproof, fireproof and non-flexible square shape thick sheet. A Data Output Connector 25 and a Power Output Connector 26 is permanently secured onto the Door Flap 43.

Adapter Guides 29 are waterproof & fireproof semi-flexible rectangular blocks. Adapter Guides 29 are secured to the Door Flap 43 permanently. Two Adapter Guides 29 are placed, close to the edge, parallel to the long-edge-sides of the Door Flap 43. The third Adapter Guide 29 placed on the middle of the Door Flap 43, parallel to the other two Adapter Guides 29.

Replaceable Adapters 28 are identical to the ones used in CPSAMV. They are placed between the Adapter Guides 29. The two pin electrical connectors of the Replaceable Adaptors 28 are connected to the Power Output Connector 26 and Data Output Connector 25, respectively. Connector Water Seals 37 are rubber O shaped rings secured to connector mouths of the Data Connector 13 and the Power Connector 14.

Door Handle 42 is a half-square shape piece with round edges, secured onto front edge of the Door Flap 43; Door Handle 42 overlaps on Finger Dip 44 halfway through.

Operating Mechanism 47 is composed of hinge arrangement, return spring assembly and a lock.

Figure 22:
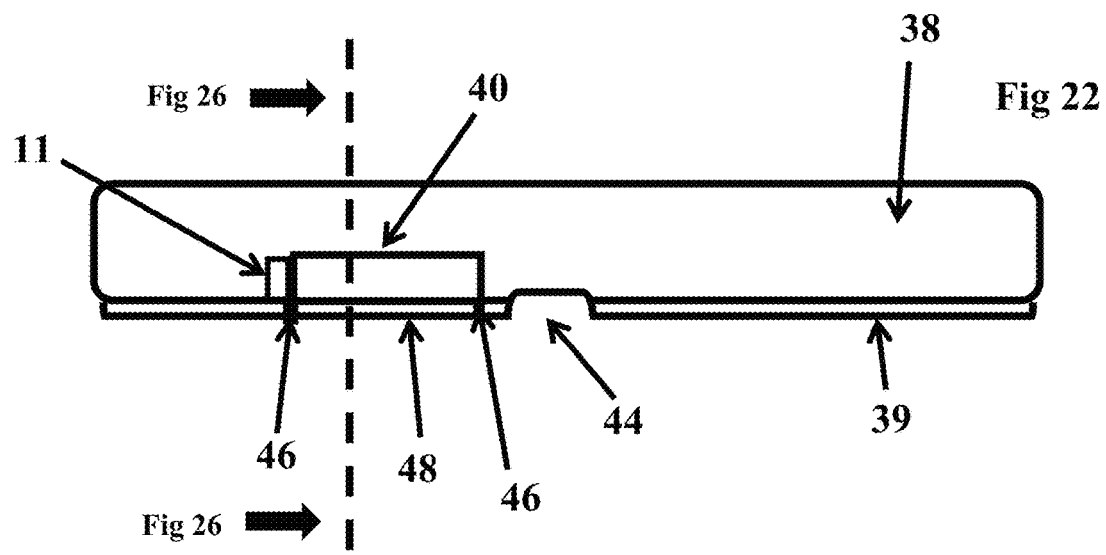
Figure 23:
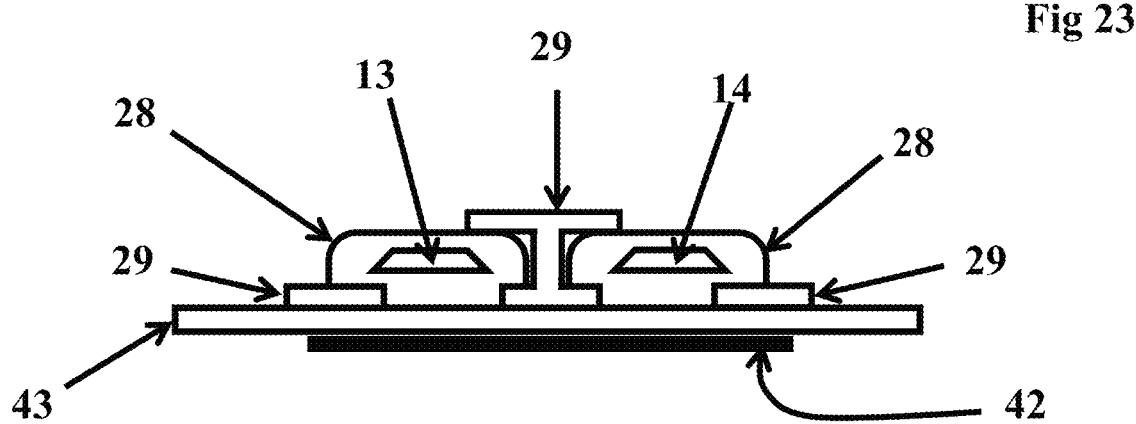
Figure 24:
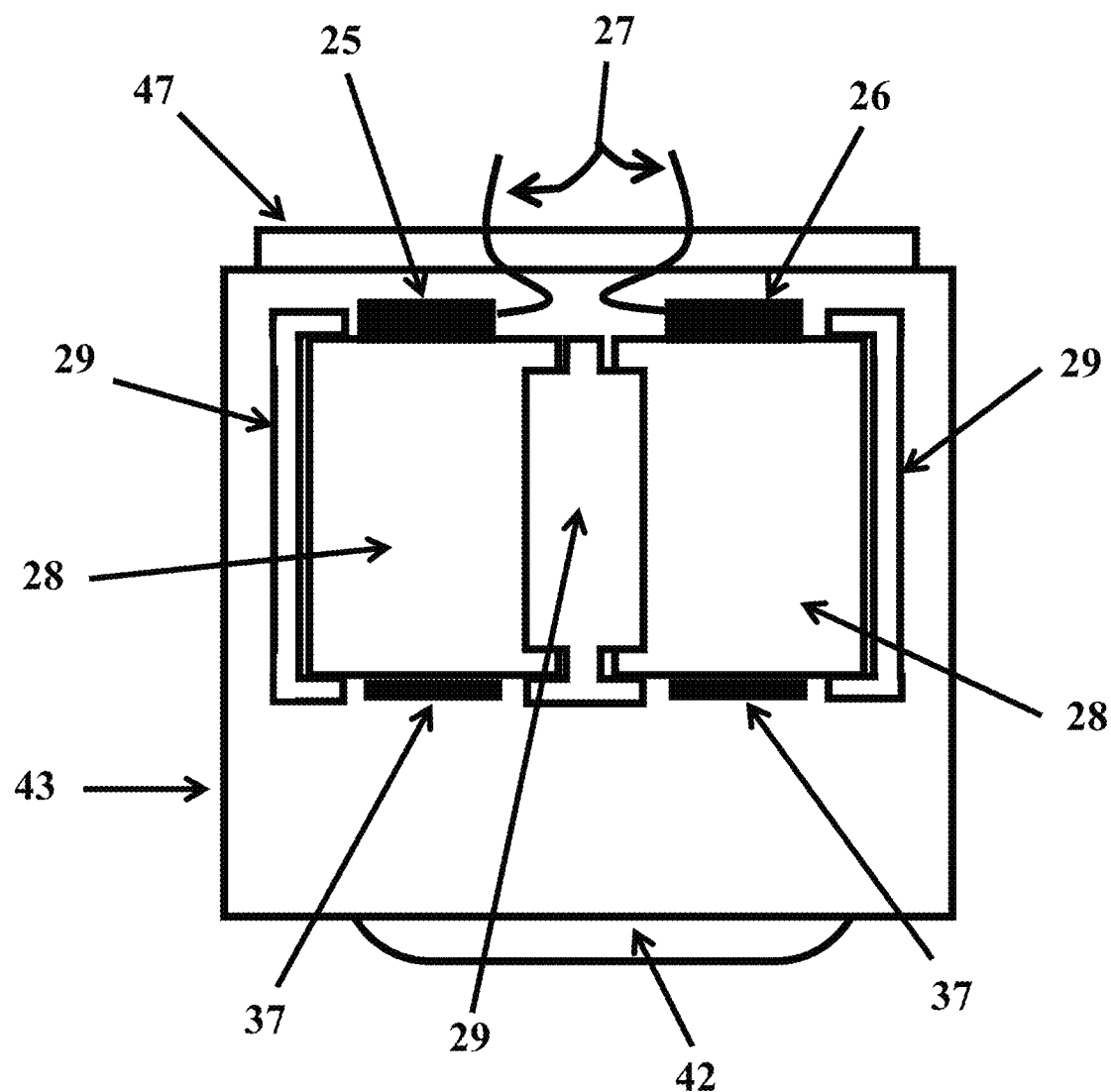
Figure 25:
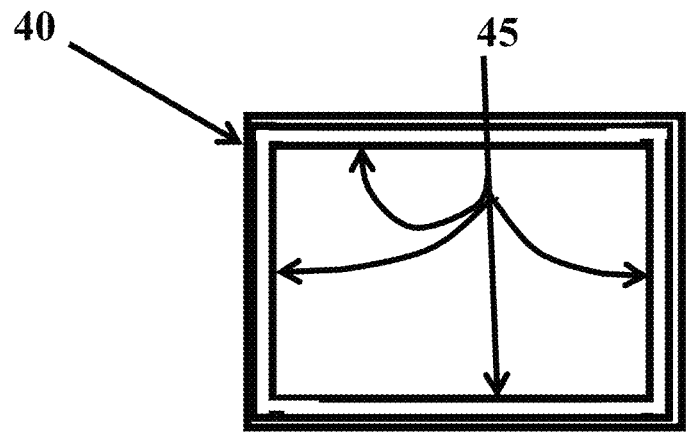
Figure 26:
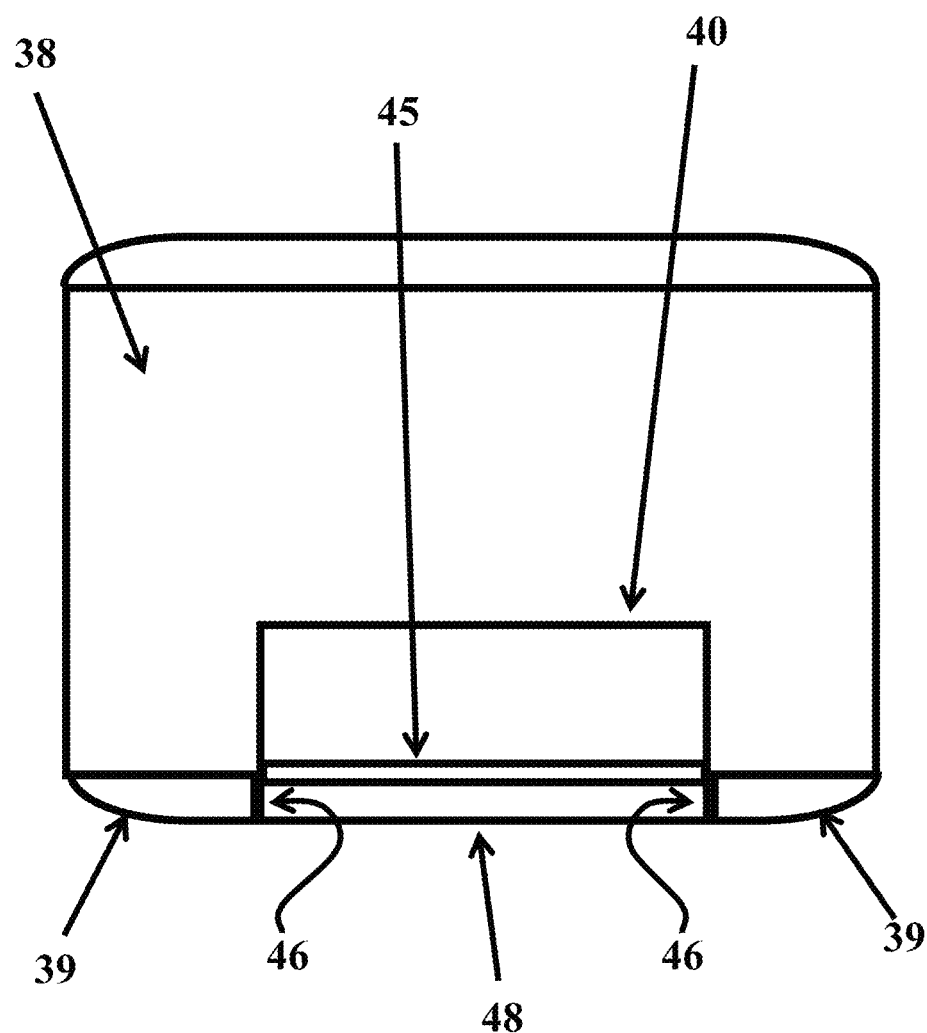

Door Cavity 40 (FIG. 22, 25, 26)

Door Cavity 40 is a box shaped object with a closed front: the back of the Door Cavity 40 is open; made of water & fire resistance material; inside surface of the Door Cavity 40 is sealed with waterproof sealant. Door Cavity is composed of Cover Opening 48, Guiding Lips 46 and Finger Dip 44.

Cover Opening 48 is a rectangular shape opening on the User Device 38 back cover.

Guiding Lips 46 are the extended walls of the Door Cavity 40: only left, right and bottom walls are extended through Cover Opening 48; Guiding Lips 46 are extended up to the outer surface of the User Device 38 back cover. The Door Cavity 40 is secured into the inner chassis of the User Device 38.

Finger Dip 44 is a half round dip on the back cover of the User Device 38: it is placed next to bottom end of the Cover Opening 48.

Junction Box 11 (FIG. 22)

Junction Box 11 is secured to the Door Cavity 40 wall. The Wires 27 are connected to the PCB 22 in Junction Box 11. The Wires 27, of Data Output Connector 25 and Power Output Connector 26, are inserted through the Hole 8 on the walls of the Door Cavity 40.

Bus Feeder 8 (FIG. 1, 2, 4, 11, 12,)

The Input Side 18 of the Bus Feeder 8 is bridged with connector designated by the handheld electronic user device manufacture, to connect bus cable of the conventional charging/data port that is on the User Device 38 motherboard and stay connected all the time. The Bus Feeder 8 Output Connector 21 is connected to the Input Connector 24 that is mounted on PCB 22 which is housed inside Junction Box 11.

The invention claimed is:

1. The Connection Protection System After Market Version and the Connection Protection System Manufacture's Version is comprised of two Micro USB Female connectors named Data Connector (13) and Power Connector (14) out of which data transfer pins of Data Connector (13) are bridged with a Microchip (23) and in turn the Microchip (23) is bridged with data transfer pins of a Connector Stem (2) that is a Micro USB Male Connector whereas the charging power supply pins of Power Connector (14) are bridged with the said Microchip (23) and in turn the Microchip (23) is bridged with charging power transfer pins of said Connector Stem (2):

a. the Connection Protection System After Market Version is comprised of a Case Assembly (15) and a Terminal Box (7) and the Case Assembly (15) is further comprised of thick side walls on three sides excluding bottom side and the said thick walls are named as Retainer Strip (3) whereas bottom wall is thinner than the said Retainer Strip (3) and the said thin wall is named as Thin Strip (6) whereas rear edges of Retainer Strip (3) along with Thin Strip (6) are molded to edgers of a flat sheet that is named as Back Wall (4) to create a rectangular box shape;

b. on the said Back Wall (4) near Thin Strip (3) a small opening named Cover Opening (5) is added whereas there are no other openings other than the Cover Opening (5) on the Retainer Strip (3) or on the Thin Strip (6) or on the Back Wall (4) so that the front side of the Case Assembly (15) is kept open;

c. the Terminal Box (7) is secured to the Back Wall (4) outer surface and the said Terminal Box (7) is comprised of two separate adapters named Replaceable Adaptors (28) and they are bridged with Microchip (23) via electrical circuitry;

d. one of the said Replaceable Adaptor (28) is comprised of the Data Connector (13) housed on one end and, a multi pin electrical connector named as Data Output Connector (25) is housed on the other end of the same adaptor, further said Data Connector (13) is bridged with a Data Output Connector (25) via electrical conductors whereas the said second Replaceable Adaptor (28) is comprised of the Power Connector (14) housed on one end and, a multi pin electrical connector named a Power Output Connector (26) is housed on the other end of the same adaptor with said Power Connector (14) is bridged with said Power Output Connector (26) via electrical conductors;

e. the said Replaceable Adaptor's (28) Output Connectors (25 & 26) and Microchip (23) are bridged via a printed circuit board named PCB (22) and in turn the PCB (22) is bridged with the Connector Stem (2) via a multi pair wire named Bus Feeder (8);

f. the said Connector Stem (2), and Input Side (18) of the Bus Feeder (8) are bridged via Connector Pins (19) and all said components are molded into an inner depth wall (20) of a U-shaped strip that is named a Connector Stem Holder (1);

g. the said Connector Stem Holder (1) is placed between the Thin Strip (6) and the consumer electronic user device that is housed in a Case Assembly (15) while the Connector Stem (2) is plugged into consumer electronic user device charging port micro-USB connector and will stay plugged in until the Case Assembly (15) or parts related to it needs replacement;

h. the Connection Protection System Manufacture's Version is comprised of the Data Connector (13) along with the Power Connector (14) and Replaceable Adaptors (28) and Microchip (23) along with the PCB (22) and the said components are further mounted on a Popup Door (41) that is a platform functioning as a flap that can be opened and closed while the flap is secured to back cover of the consumer electronic user device;

i. an open box shape object named a Door Cavity (40) is positioned inside the consumer electronic user device through the back cover in a such a way to create a confined space to accommodate the said components that are mounted on the Popup Door (41) while the Popup Door (41) is closed, and in turn to create an even surface on the consumer electronic user device back cover;

j. the PCB (22) is bridged to consumer electronic user device motherboard charging and data port via a multi pair electrical wire that is named a Bus Feeder (8).

\* \* \* \* \*